May 3, 1955

G. O. WILKINSON 2,707,454

WIND OPERATED BIRD FEEDER

Filed Nov. 20, 1952

INVENTOR.
GORDON O. WILKINSON
BY
ATTORNEY

May 3, 1955  G. O. WILKINSON  2,707,454
WIND OPERATED BIRD FEEDER
Filed Nov. 20, 1952  2 Sheets-Sheet 2
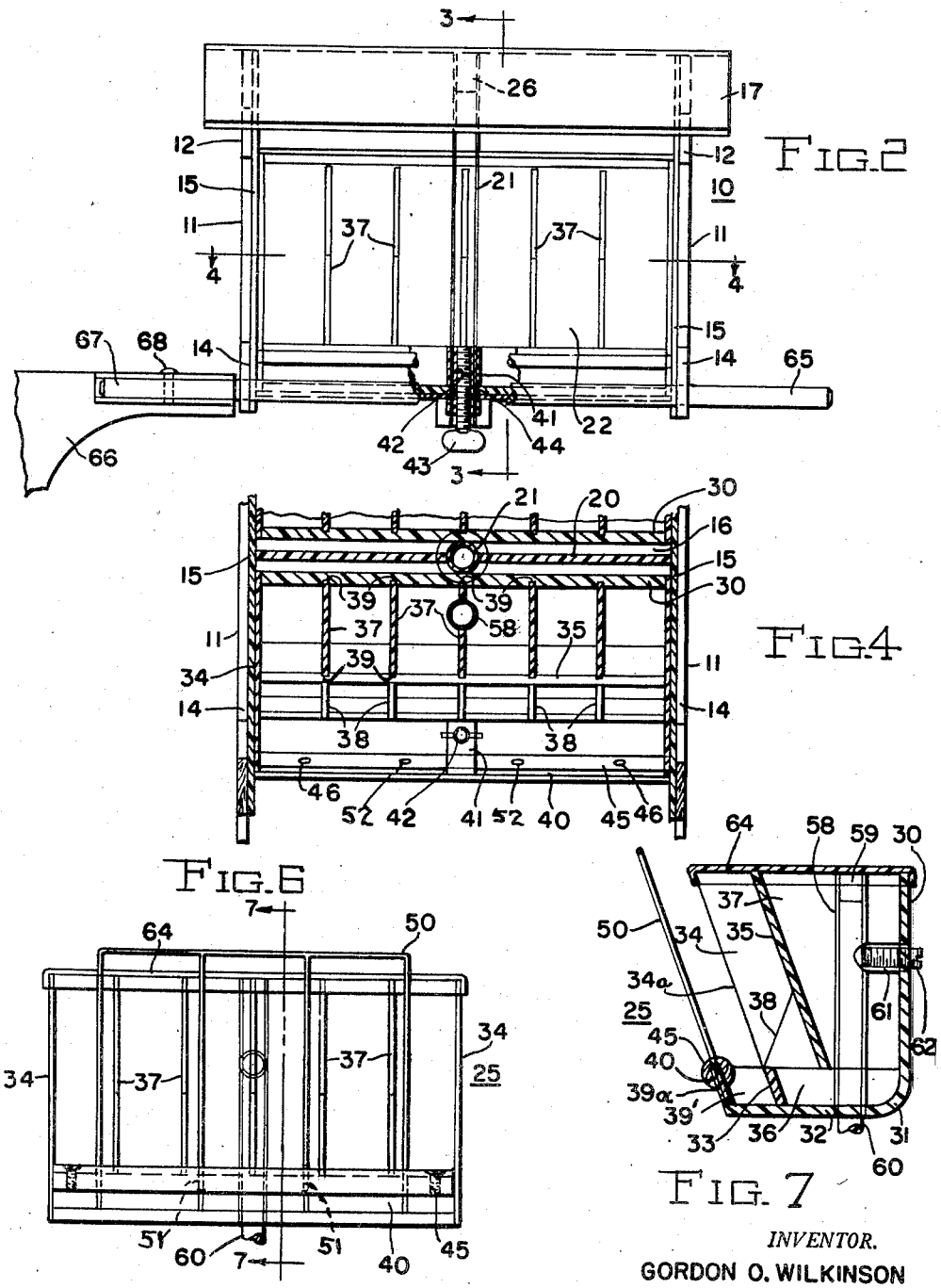
INVENTOR.
GORDON O. WILKINSON
BY
ATTORNEY

United States Patent Office 2,707,454
Patented May 3, 1955

2,707,454

WIND OPERATED BIRD FEEDER

Gordon O. Wilkinson, Ardmore, Pa.

Application November 20, 1952, Serial No. 321,556

6 Claims. (Cl. 119—51)

This invention relates to bird feeders and more particularly to improvements in such bird feeders in which the feed containers are easily removable.

It is the principal object of the present invention to provide a bird feeder with feed containers which can be easily supplied with feed and are easily removable.

It is a further object of the present invention to provide a bird feeder which accommodates a large amount of feed so that constant attention to and replacement of the feed supply is unnecessary.

It is a further object of the present invention to provide a bird feeder which can be simply constructed from easily obtainable and relatively inexpensive materials.

It is a further object of the present invention to provide a bird feeder made from materials which are weather resistant.

It is a further object of the present invention to provide a bird feeder which minimizes the waste of feed due to bird eating habits.

It is a further object of the present invention to provide a bird feeder which can be easily cleaned when required.

It is a further object of the present invention to provide a bird feeder in which the feed is protected against the scattering effects of the winds.

It is a further object of the present invention to provide a bird feeder which permits of the orderly feeding of the desirable song birds without interference from the larger undesirable birds.

Other objects and advantageous features of the present invention will be apparent from the specification and claims.

The nature and characteristic features of the invention will be more readily understood from the following description, taken in connection with the accompanying drawings forming part hereof, in which:

Fig. 2 is a vertical end view of the bird feeder, parts being broken away to show the details of construction;

Fig. 4 is a horizontal sectional view taken approximately on the line 4—4 of Fig. 2;

Fig. 6 is a vertical end view of one of the feed hoppers removed from the house; and Fig. 7 is a vertical sectional view taken on the line 7—7 of Fig. 6.

Figure 1:
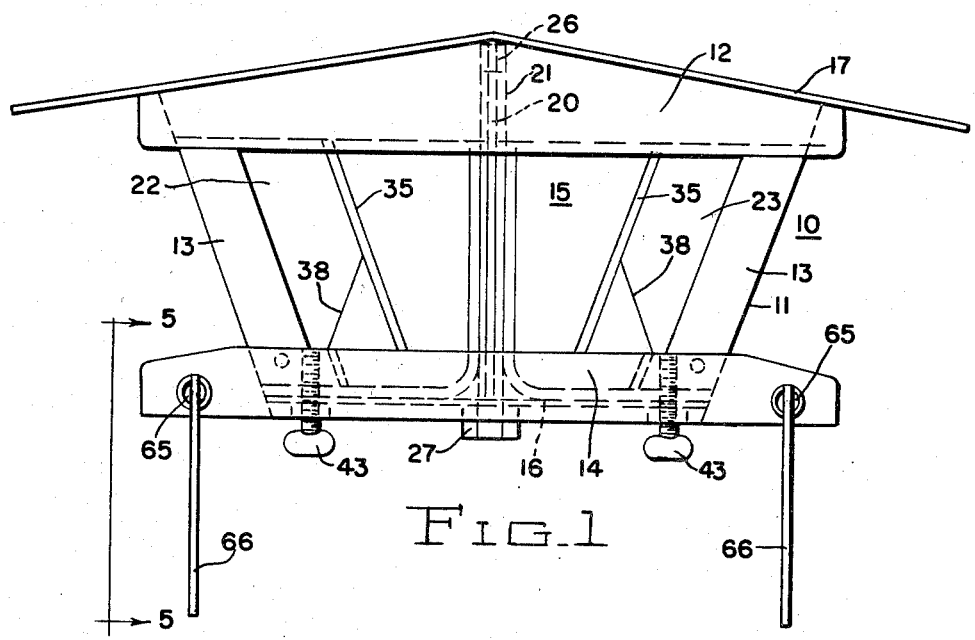
Figure 1 is a vertical side view of a preferred embodiment of the present invention.
Figure 3:
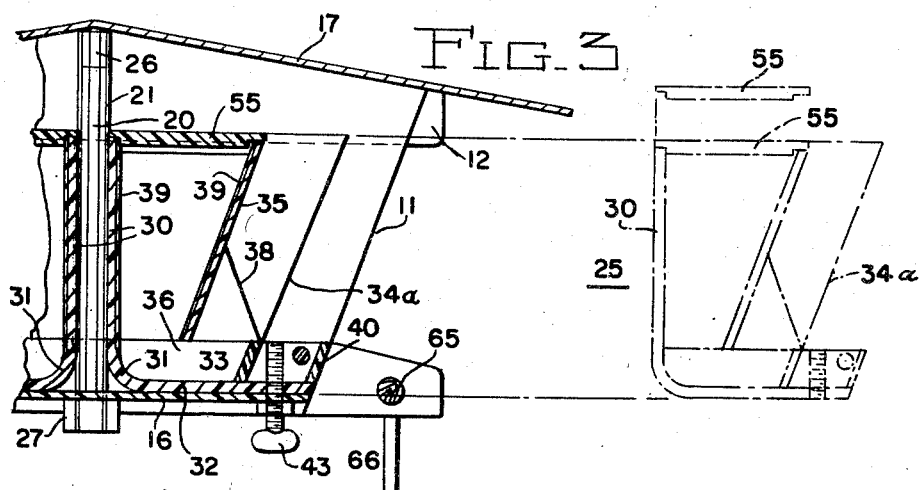
Fig. 3 is a vertical sectional view taken approximately on the line 3—3 of Fig. 2 showing the feed hopper positioned in the bird feeder and showing the manner of removal.
Figure 5:
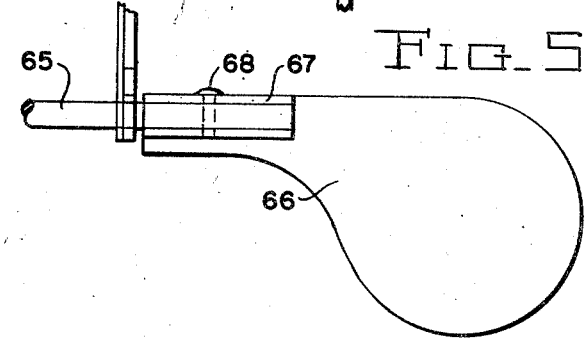
Fig. 5 is a vertical sectional view taken on the line 5—5 of Fig. 1.

It should, of course, be understood that the description and drawings herein are illustrative merely, and that various modifications and changes may be made in the structure disclosed without departing from the spirit of the invention.

Referring more particularly to the drawings, the bird feeder, in accordance with the present invention preferably includes a house 10 having a pair of vertical side walls 11 each composed of an upper rail 12, two side rails 13 disposed at opposite ends of the upper rail 12 and sloping inwardly and downwardly, a lower rail 14 which extends beyond the lower ends of the side rails 13 and a transparent panel member 15 positioned interiorly to the rails 13, extending from the top of the upper rail 12 to the bottom of the lower rail 14 and between the outer extremities of the side rails 13. The rails 12, 13 and 14 are made of any suitable material preferably light plastic sheet material and can be decorated to simulate bark. A floor 16 preferably of light transparent plastic sheet material is positioned horizontally between the lower edges of the panel members 15 and is secured thereto.

A roof 17, of waterproof sheet material, is provided and extends beyond upper and lower rails 12 and 14 and is secured to the side walls 11 in any suitable manner. A vertically disposed central panel 20 extends from the floor 16 to the roof 17 and from one side wall 11 to the other side wall 11, a central vertical hollow cylindrical member 21 being formed therein. The panel 20 serves to divide the bird feeder into two enclosed chambers 22 and 23 and at the same time provides a back stop against which two feed hoppers 25 may rest, as will be hereinafter explained. The opening in the central vertical cylindrical member 21 extends through the floor 16 to the roof 17 for the reception of a vertical supporting pin or shaft (not shown) to permit rotational movement of the bird feeder if desired. A closure plug 26 is provided in the topmost part of the opening in the cylindrical member 21 as an abutment for the supporting pin or shaft.

A flat plate 27 extending centrally from one wall 11 to the other wall 11 and of suitable width is attached to the underneath face of the floor 16. The plate 27 serves as a reinforcement for the floor 16 and is also available for the attachment of a weather vane (not shown) if desired.

Within the house 10, and in each of the chambers 22 and 23, the feed hoppers 25 are provided, preferably of light transparent plastic sheet material. Each feed hopper 25 has a vertical back panel 30, a lower downwardly sloped panel 31 extending from the lower terminal of the back panel 30 inwardly to the back terminal of a horizontal bottom panel 32. The bottom panel 32 has at the front edge thereof an inclined lip 33. The panels 30, 31 and 32 and the lip 33 extend between parallel vertical side panels 34 and are secured thereto. Spaced forwardly from the back panel 30, a front panel 35 is provided in inclined relation to the back panel 30. A plurality of spaced parallel lower walls 36, preferably of light plastic sheet material of the approximate height as the sloped panel 31 and the upturned lip 33 extends transversely to the front panel 35 and the back panel 30 from the upturned lip 33 to the sloped panel 31 and back panel 30 and are secured thereto. A plurality of spaced parallel upper trapezoidally shaped walls 37 are coplaner with, positioned above and in adherent engagement with the front portion of the spaced lower walls 36. A plurality of slots 39 in the sloped front panel 35 and the back panel 30 are provided to accommodate the side edges of the spaced upper walls 37. A plurality of spaced triangularly shaped front walls 38 corresponding to the lower walls 36 and upper walls 37 are positioned above, in alignment and in adherent engagement with the lower walls 36. The rear edges of the front walls 38 are secured to the sloped front panel 35.

Each of the side panels 34 has an upper forward extension with a front marginal edge 34a spaced forwardly with respect to and disposed parallel to the plane of the front panel 35.

As best seen in Fig. 7, each of the side panels 34 also has a lower forward extension or strip 39', with a front marginal edge 39a spaced forwardly with respect to and disposed parallel to the plane of the front marginal edges 34a.

A front strip 40 generally parallel to the lip 33 is provided secured to the front edge portions of the side strips 39'. A thick central strip 41 is provided extending from the back face of the front strip 40 to the front face of the lip 33 and is secured thereto. Extending upwardly from the bottom of the central strip 41, an internally threaded hole 42 is provided to accommodate a set screw 43 for attaching the feed hoppers 25 to the floor 16 of the house 10. A corresponding hole 44 is provided in the floor 16 of the house 10 for the insertion of the set screw 43.

A top strip 45 of suitable material, preferably wood, is superposed on the front strip 40 of approximately the same length as the front strip 40 and is secured thereto in any suitable manner, such as by screws 46. A large bird guard 50 is provided preferably of wire with legs 51 which extend downwardly into holes 52 in the front strip 40 for the purpose of removably mounting the guard on the feed hoppers 25.

A top panel 55 is provided for access to the interior of each of the feed hoppers 25.

The feed hoppers 25 in addition to their use in the house 10 may also be used for other purposes. A vertical hollow cylindrical member 58 is provided in the centermost walls 36 and 37 and is provided with a closure plug 59 at the top thereof as an abutment for a vertical mounting rod 60 supported in any desired manner. A horizontal hollow cylindrical member 61, internally threaded may also be provided for the insertion of a set screw 62 for clamping the rod 60, or for inserting a threaded mounting rod (not shown).

If the feed hoppers 25 are separately mounted outside the house 10 a larger top cover 64 is preferably employed.

A horizontal cylindrical rod 65, preferably made of wood, is provided extending between, through and beyond the lower outermost portions of the lower rails 14 to serve as a perch for the purpose of facilitating the landing of the birds.

Flat, vertically disposed wind vanes 66, preferably of suitable plastic sheet material, are provided each with an upper horizontal sleeve 67 for slidable engagement with the ends of the rods 65. Pins 68 extending through the sleeves 67 and rods 65 hold the vanes 66 in place.

The bird feeder of the present invention is preferably made from a strong, lightweight, easily-workable, readily accessible materials and for the most part, preferably synthetic plastic. The feed hoppers 25 are preferably made from transparent synthetic plastic material so that the supply of feed can be quickly determined visually.

The house 10 is so constructed in its relation to the hoppers 25 with wide roof overhang and solid side walls, that the feed in the feed hoppers 25 is protected from the waste by wind, rain and snow. The wind vanes 66 position the house 10 so that the open ends are never facing into the wind, thus further minimizing and generally eliminating deleterious results caused by gales and storms. The central panel 20 provides a barrier to the passage of wind which might otherwise pass through the house 10 and carry away the lighter components of the feed. The feed hoppers 25 are detachably positioned so that easy removal can be effected when cleaning or the addition of feed is necessary.

The feed hoppers 25 have a plurality of compartments or bins for the feed. The lip 33 prevents the overflow of feed from the feed hopper and in conjunction with the lower walls 36 and the front walls 38 form a suitable area for access to the feed by the birds. The walls 38 prevent the waste of feed from the sweeping or sidewise motions of the heads of birds when they are eating, such motions would otherwise scatter feed and waste it.

The feed hoppers 25 are so constructed that there are no locations where feed can become lodged or impeded while in addition smooth surfaces are provided for the constant easy flow of feed.

The feed hoppers 25 accommodate a large amount of feed so that frequent refilling is unnecessary.

I claim:

1. In a bird feeder, a housing having the interior thereof divided into a pair of chambers with opposed open ends, a pair of feed containers removably disposed interiorly one in each of said chambers, said containers each having a pair of vertical side panels, an upper vertical back panel, a lower inclined back panel connected to said vertical panels, a bottom panel, a lower front panel connected to said side panels, an upper front inclined panel disposed interiorly with respect to said lower front panel and a plurality of spaced walls extending from said back panel to said lower front panel and disposed to receive the lower part of said upper front panel within the outer edges of said spaced walls, said spaced walls having portions extending forwardly beyond said upper front panel.

2. In a bird feeder, a housing having the interior thereof divided into a pair of chambers with opposed openings, a pair of feed containers removably disposed interiorly one in each of said chambers, said containers each having a pair of vertical side panels, an upper vertical back panel extending between said side panels, a lower inclined back panel between said side panels, a bottom panel between said side panels, a lower front panel between said side panels, an upper front inclined panel disposed interiorly with respect to said lower front panel and extending between said side panels, a plurality of spaced parallel walls extending from said back panels to said lower front panel and disposed to receive the lower part of said upper front panel within the outer edges of said spaced walls, said spaced walls having portions extending beyond said upper front panel, a horizontal top panel in engagement with all of said upper panels, a front strip extending between outward extensions of said side panels, a second strip extending between said front strip and said lower front panel.

3. In a bird feeder, a housing having the interior thereof divided into a pair of chambers with opposed openings, a pair of feed containers removably disposed interiorly one in each of said chambers, said containers each having a pair of vertical side panels, an upper vertical back panel, extending between said side panels, a lower inclined back panel between said side panels, a bottom panel between said side panels, a lower front panel between said side panels, an upper front inclined panel disposed interiorly with respect to said lower front panel and extending between said side panels, a plurality of spaced parallel walls extending from said back panels to said lower front panel and disposed to receive the lower part of said upper front panel within the outer edges of said spaced walls, said spaced walls having portions extending forwardly beyond said upper front panel, a front strip extending between outward extensions of said side panels, a second strip extending between said front strip and said lower front panel, said second strip having a hole therein and a member in engagement with said housing and in said hole for holding said feed container in position.

4. In a bird feeder, a feed container having a pair of vertical side panels, an upper vertical back panel extending between said side panels, a lower inwardly inclined back panel between said side panels, a horizontal bottom panel between said side panels, a lower front outwardly inclined panel between said side panels, an upper front inwardly inclined panel disposed interiorly with respect to said lower front panel and extending between said side panels, a plurality of horizontally divided spaced parallel walls extending from said back panels to said lower front panel and disposed to receive the lower part of said upper front panel within the outer edges of said spaced walls, said spaced walls having portions extending beyond said upper front panel, a horizontal top panel in engagement with said upper panels, a front strip extending between outward extensions of said side panels, and a hollow vertical cylindrical socket member interposed in one of said spaced walls.

5. In a bird feeder, a feed container having a pair of vertical side panels, an upper vertical back panel extending between said side panels, a lower inwardly inclined back panel between said side panels, a horizontal bottom panel between said side panels, a lower front outwardly inclined panel between said side panels, an upper front inwardly inclined panel disposed interiorly with respect to said lower front panel and extending between said side panels, a plurality of horizontally divided spaced parallel walls extending from said back panels to said lower front panel and disposed to receive the lower part of said upper front panel within the outer edges of said spaced walls, said spaced walls having portions extending beyond said upper front panel, a horizontal top panel in engagement with said upper panels, a front strip extending between outward extensions of said side panels and a hollow horizontal cylindrical socket member interposed in one of said spaced walls.

6. In a bird feeder, a feed container having a pair of vertical side panels, an upper vertical back panel extending between said side panels, a lower inwardly inclined back panel between said side panels, a horizontal bottom panel between said side panels, a lower front outwardly inclined panel between said side panels, an upper front inwardly inclined panel disposed interiorly with respect to said lower front panel and extending between said side panels, a plurality of horizontally divided spaced parallel walls extending from said back panels to said lower front panel and disposed to receive the lower part of said upper front panel within the outer edges of said spaced walls, said spaced walls having portions extending beyond said upper front panel, a horizontal top panel in engagement with said upper panels, a front strip extending between outward extensions of said side panels, a hollow vertical cylindrical member interposed in one of said spaced walls, and a hollow horizontal cylindrical socket member interposed in interesting relation to said vertical cylindrical member.

References Cited in the file of this patent

UNITED STATES PATENTS

| Number | Name | Date |
|---|---|---|
| 2,230,058 | Hornung | Jan. 28, 1941 |
| 2,235,959 | Copeman | Mar. 25, 1941 |
| 2,349,868 | Hyde | May 30, 1944 |
| 2,500,243 | Dixon | Mar. 14, 1950 |
| 2,524,502 | Wilkinson | Oct. 3, 1950 |
| 2,566,446 | Gomer | Sept. 4, 1951 |
| 2,624,311 | Amstutz | Jan. 6, 1953 |